US006654229B2

United States Patent
Yanagisawa et al.

(10) Patent No.: US 6,654,229 B2
(45) Date of Patent: Nov. 25, 2003

(54) ELECTRODE MATERIAL FOR ELECTRIC DOUBLE LAYER CAPACITOR AND ELECTRIC DOUBLE LAYER CAPACITOR USING THE SAME

(75) Inventors: Takashi Yanagisawa, Tokyo (JP); Morinobu Endo, Suzaka (JP)

(73) Assignees: GSI Creos Corporation, Tokyo (JP); Morinobu Endo, Suzaka (JP)

( * ) Notice: Subject to any disclaimer, the term of this patent is extended or adjusted under 35 U.S.C. 154(b) by 0 days.

(21) Appl. No.: 10/098,379

(22) Filed: Mar. 18, 2002

(65) Prior Publication Data

US 2002/0141140 A1 Oct. 3, 2002

(51) Int. Cl.$^7$ .................................................. H01G 9/00
(52) U.S. Cl. ....................... 361/502; 361/503; 361/508; 361/512; 361/516; 429/40; 429/44
(58) Field of Search ................................. 361/503, 502, 361/504, 508, 509, 510, 512, 518, 516, 535, 525; 429/40, 44, 231.8, 235

(56) References Cited

U.S. PATENT DOCUMENTS

| 5,102,745 | A | * | 4/1992 | Tatarchuk et al. |
| 6,288,888 | B1 | * | 9/2001 | Sakata et al. |
| 6,511,768 | B1 | * | 1/2003 | Trapp et al. |
| 6,515,845 | B1 | * | 2/2003 | Oh et al. |
| 6,521,369 | B1 | * | 2/2003 | Mercuri et al. |
| 6,528,211 | B1 | * | 3/2003 | Nishimura et al. |

OTHER PUBLICATIONS

U.S. patent application Ser. No. 10/098,375, Yanagisawa et al., filed Mar. 18, 2002.
U.S. patent application Ser. No. 10/098,416, Yanagisawa et al., filed Mar. 18, 2002.
U.S. patent application Ser. No. 10/098,351, Yanagisawa et al., filed Mar. 18, 2002.
U.S. patent application Ser. No. 10/098,396, Yanagisawa et al., filed Mar. 18, 2002.
U.S. patent application Ser. No. 10/098,461, Yanagisawa et al., filed Mar. 18, 2002.
U.S. patent application Ser. No. 10/098,440, Yanagisawa et al., filed Mar. 18, 2002.
U.S. patent application Ser. No. 10/098,103, Yanagisawa et al., filed Mar. 18, 2002.
U.S. patent application Ser. No. 10/098,522, Yanagisawa et al., filed Mar. 18, 2002.
U.S. patent application Ser. No. 10/098,312, Yanagisawa et al., filed Mar. 18, 2002.
U.S. patent application Ser. No. 10/098,570, Yanagisawa et al., filed Mar. 18, 2002.
Endo et al., "Structural characterization of cup–stacked–type nanofibers with an entirely hollow core", Applied Physics Letters, vol. 80, No. 7, Feb. 18, 2002, pp. 1267–1269.
Kim et al., "Effect of ball milling on morphology of cup–stacked carbon nanotubes", Chemical Physics Letters, Apr. 2, 2002.

* cited by examiner

Primary Examiner—Dean A. Reichard
Assistant Examiner—Nguyen Ha
(74) Attorney, Agent, or Firm—Oliff & Berridge, PLC

(57) ABSTRACT

An electrode material for an electric double layer capacitor having a carbon fiber as an essential material. The carbon fiber has a coaxial stacking morphology of truncated conical tubular graphene layers, and each of the truncated conical tubular graphene layers includes a hexagonal carbon layer. Edges of the hexagonal carbon layer are exposed. The exposed edges of the hexagonal carbon layers have a high degree of activity and can be modified with functional groups such as —COOH, —CHO, or —OH. This enables use of the carbon fiber as the electrode material. The specific surface area of the surfaces on which the edges are exposed is extremely large, whereby a large-capacitance electric double layer capacitor can be formed.

20 Claims, 18 Drawing Sheets

ELECTRODE MATERIAL FOR ELECTRIC DOUBLE LAYER CAPACITOR AND ELECTRIC DOUBLE LAYER CAPACITOR USING THE SAME

Japanese Patent Application No. 2001-81744, filed on Mar. 21, 2001, and Japanese Patent Application No. 2001-260427, filed on Aug. 29, 2001, are herein incorporated by reference in their entirety.

BACKGROUND OF THE INVENTION

The present invention relates to an electrode material for an electric double layer capacitor and an electric double layer capacitor using the electrode material.

An electric double layer capacitor has been used for a backup power supply for a personal computer memory, an auxiliary or backup for a secondary battery, for a backup power supply for an electric vehicle battery or a fuel cell vehicle battery, for a power supply for hybrids, or the like.

When a voltage is applied between two electrodes, ions in an electrolyte solution are absorbed onto surfaces of polarizable electrodes and an electric double layer is formed in the interface between the electrodes and electrolyte solution. The electric double layer capacitor stores charges in this electric double layer (FIG. 16).

This electrolytic double layer capacitor has a large capacitance for storing electricity, about one million times that of a conventional capacitor.

In a conventional electric double layer capacitor, activated carbon is used for the electrodes. Since activated carbon particles have a large number of pores and a large specific surface area, activated carbon is suitable for the electrodes.

BRIEF SUMMARY OF THE INVENTION

The present invention may provide an electric double layer capacitor enabling a further increase in the capacitance by using a carbon fiber having a larger specific surface area, and an electrode material for such electric double layer capacitor.

According to a first aspect of the present invention, there is provided an electrode material for an electric double layer capacitor comprising a coaxial stacking morphology of truncated conical tubular graphene layers, wherein each of the truncated conical tubular graphene layers includes a hexagonal carbon layer.

In other words, this carbon fiber has a cup-stacked structure or a lampshade-stacked structure in which a number of hexagonal carbon layers in the shape of a bottomless cup are stacked. The coaxial stacking morphology of the truncated conical tubular graphene layers may have a shape of a hollow core with no bridge. According to such a structure, each of the truncated conical tubular graphene layers has a large ring end at one end and a small ring end at the other end in an axial direction, wherein edges of the hexagonal carbon layers are exposed at the large ring ends of the outer surface and the small ring ends of the inner surface. In other words, the edges of the tilted hexagonal carbon layers having a herring-bone structure are exposed in layers.

In an ordinary carbon fiber with a herring-bone structure, a number of hexagonal carbon layers in the shape of a cup having a bottom are stacked. However, the carbon fiber according to the first aspect of the present invention has a hollow structure with no bridge and has a length ranging from several tens of nanometers to several tens of microns.

If the coaxial stacking morphology of the truncated conical tubular graphene layers is vapor grown, a wide area of an outer surface or an inner surface may be covered with a deposited film of an excess amount of pyrolytic carbons. However, at least part of edges of the hexagonal carbon layers may be exposed at the large ring ends on the outer surface side or at the small ring ends on the inner surface side.

The edges of the hexagonal carbon layers exposed on the outer surface or the inner surface of the carbon fiber have an extremely high degree of activity, exhibit good affinity to various types of materials, and excel in adhesion to base materials such as resins. Therefore, a composite excelling in tensile strength and compressive strength can be obtained.

In this carbon fiber, part or all of the deposited films formed over the outer surface or the inner surface during the vapor growth process of the carbon fiber may be removed by a treatment to be performed later. It is because the deposited layers are formed of an excess amount of insufficiently crystallized amorphous carbon, and the surfaces of the deposited layers are inactive.

In the carbon fiber according to the first aspect of the present invention, an outer surface of the carbon fiber may be formed of the large ring ends stacked in the axial direction; and exposed part of the edges of the hexagonal carbon layers may have an area equal to or more than 2% of an area of the outer surface, and preferably 7% of an area of the outer surface.

The positions of the large ring ends forming the outer surface may be irregular, and the outer surface may have minute irregularity at the level of atoms.

Similarly, an inner surface of the carbon fiber may be formed of the small ring ends stacked in the axial direction; and positions of the small ring ends forming the inner surface may be irregular, and the inner surface may have minute irregularity at the level of atoms.

The exposed edges of the hexagonal carbon layers have a high degree of activity and can be modified with functional groups such as —COOH, —CHO, or —OH. This enables the carbon fiber to be used as the electrode material.

Since positions of edges of the hexagonal carbon layers exposed on the surfaces of the carbon fiber are irregular, the surfaces have minute irregularity at the level of atoms. Therefore, the specific surface area of the carbon fiber is extremely large, enabling a large-capacitance electric double layer capacitor.

A carbon fiber in which at least part of gaps between the hexagonal carbon layers is larger than the gaps between the hexagonal carbon layers at the time of vapor growth, may be used as the electrode material. In this case, the bulk density of the electrode material may be 0.010 g/cm$^3$ or less. A carbon fiber in which one to several tens of thousands of the hexagonal carbon layers are stacked may also be used.

In the electrode material for an electric double layer capacitor comprising a carbon fiber as an essential material according to a second aspect of the present invention, the carbon fiber has a coaxial stacking morphology of truncated conical tubular graphene layers, and the coaxial stacking morphology of the truncated conical tubular graphene layers includes one to several hundreds of stacked hexagonal carbon layers. Also in this case, at least part of the cyclic edges of the hexagonal carbon layers are exposed on the outer surface or inner surface of the carbon fiber.

According to a third aspect of the present invention, there is provided an electric double layer capacitor in which the above-described electrode material is used for an electrode.

DETAILED DESCRIPTION OF THE EMBODIMENT

Embodiments of the present invention will be described below in detail with reference to the drawings.

An electrode material for an electric double layer capacitor comprising a carbon fiber as an essential material according to a first embodiment of the present invention is described below.

A vapor-grown carbon fiber is a short fiber in which carbon obtained by pyrolysis of hydrocarbons such as benzene or methane at a temperature of about 700° C. to 1000° C. is grown with a catalyst particle such as a ultra-fine iron particle or nickel as a nucleus.

Carbon fibers generally have a structure in which the hexagonal carbon layers are grown concentrically or a structure in which the hexagonal carbon layers are grown in the axial direction. However, depending upon the vapor growth conditions such as catalyst, temperature range, and flow rate, carbon fibers may have a herring-bone structure in which the stacked hexagonal carbon layers are tilted with respect to the fiber axis at an specific angle.

In an ordinary carbon fibers with a herring-bone structure, a number of hexagonal carbon layers in the shape of a cup having a bottom are stacked. However, the vapor-grown carbon fiber according to the first embodiment of the present invention has a structure in which a number of hexagonal carbon layers in the shape of a bottomless cup are stacked (this bottomless type carbon fiber is hereinafter called "a carbon fiber having a herring-one structure").

Figures 17, 18:
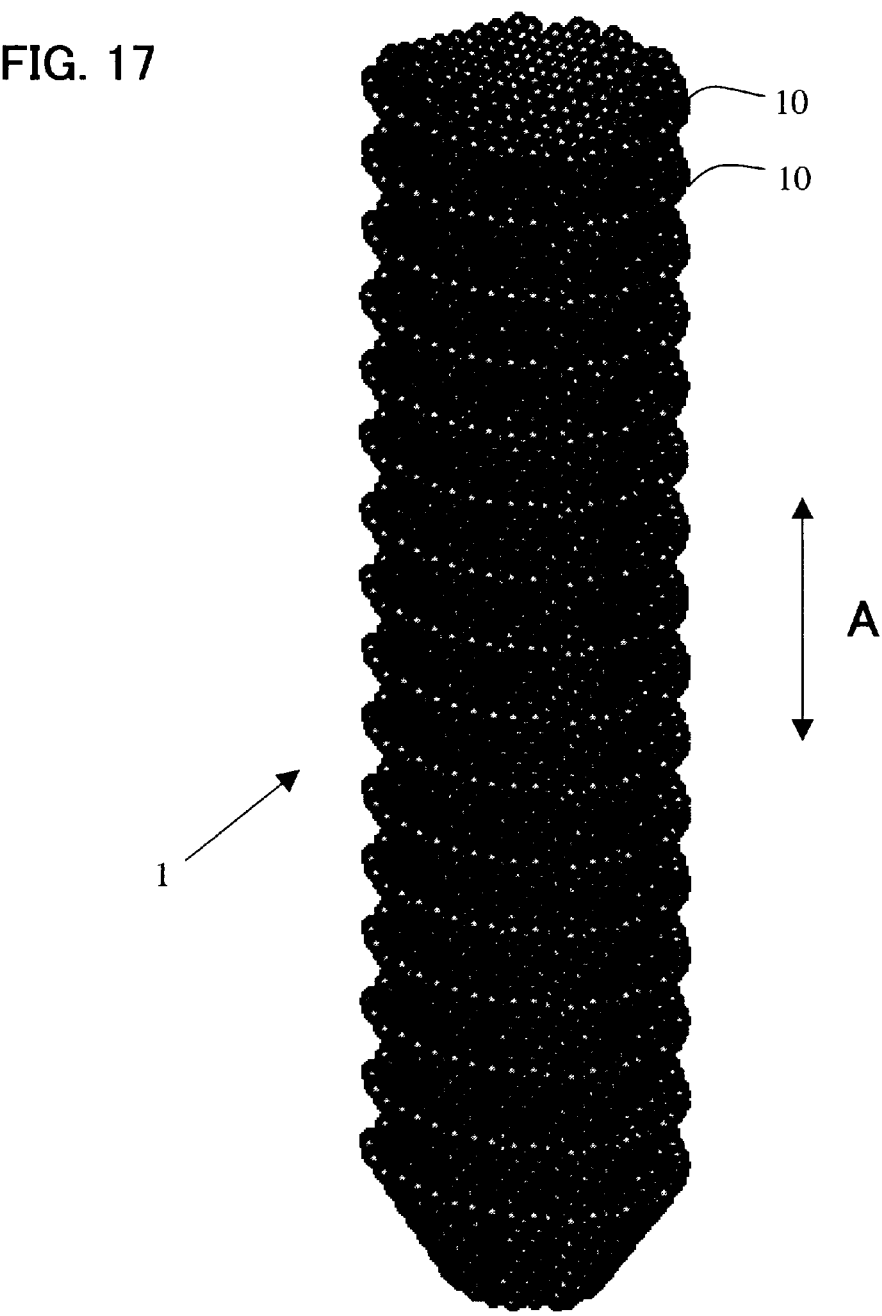
FIG. 17 is a computer graphic showing a coaxial stacking morphology of truncated conical tubular graphene layers, based on rigorous quantum theoretical calculations.
FIG. 18 is a computer graphic of a hexagonal carbon layer, which is a unit of the coaxial stacking morphology of the truncated conical tubular graphene layers shown of FIG. 17, based on rigorous quantum theoretical calculations.

Specifically, this carbon fiber has a coaxial stacking morphology of truncated conical tubular graphene layers shown by computer graphics in FIG. 17. Each of the truncated conical tubular graphene layers is formed of a hexagonal carbon layer 10 shown in FIG. 18. Although the actual hexagonal carbon layers 10 shown in FIG. 17 are stacked densely in an axial direction A, they are stacked roughly in FIG. 17 for convenience of description.

Figure 19:
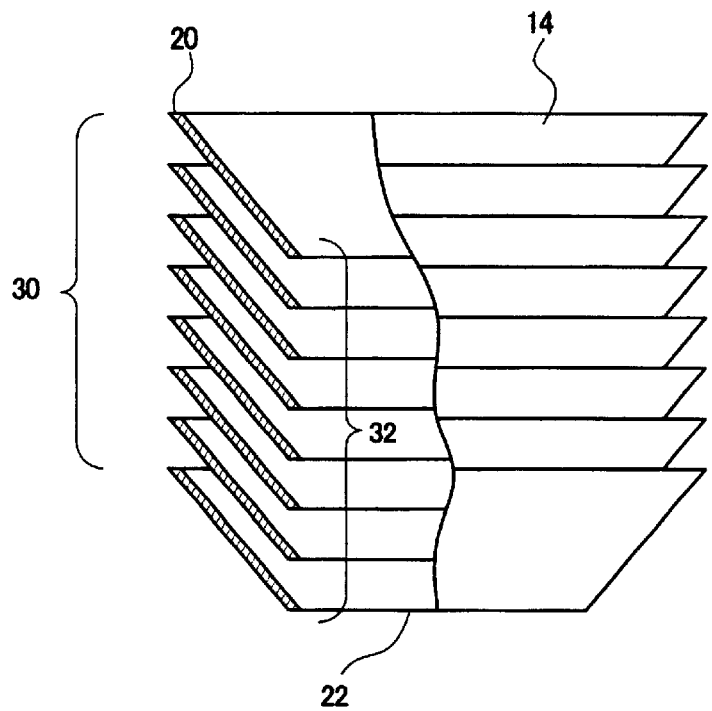
FIG. 19 is a schematic view of a large ring end and a small ring end respectively forming an outer surface and an inner surface of the coaxial stacking morphology of truncated conical tubular graphene layers.

FIG. 19 is a schematic view of FIG. 17. Each of the hexagonal carbon layers 10 has a large ring end 20 and a small ring end 22 at opposite ends in the axial direction. The large ring ends 20 are stacked in the axial direction A to form an outer surface 30 of the carbon fiber 1. The small ring ends 22 are stacked in the axial direction A to form an inner surface 32 of the carbon fiber 1. The carbon fiber 1 is thus in the shape of a hollow core with no bridge and has a center hole 14.

An example of a method of manufacturing the carbon fiber 1 shown in FIG. 17 is described below.

A conventional vertical type reactor was used.

Benzene as a raw material was fed to a chamber of the reactor using a hydrogen stream at a flow rate of 0.3 l/h and a partial pressure equivalent to the vapor pressure at about 20° C. Ferrocene as a catalyst was vaporized at 185° C. and fed to the chamber at a concentration of about $3\times10^{-7}$ mol/s. The reaction temperature and the reaction time were about 1100° C. and about 20 minutes, respectively. As a result, a carbon fiber having a herring-bone structure with an average diameter of about 100 nm was obtained. A hollow carbon fiber having no bridge at a length ranging from several tens of nanometers to several tens of microns, in which a number of hexagonal carbon layers in the shape of a bottomless cup are stacked, is obtained by adjusting the flow rate of the raw material and the reaction temperature (which are changed depending on the size of the reactor).

Figure 1:
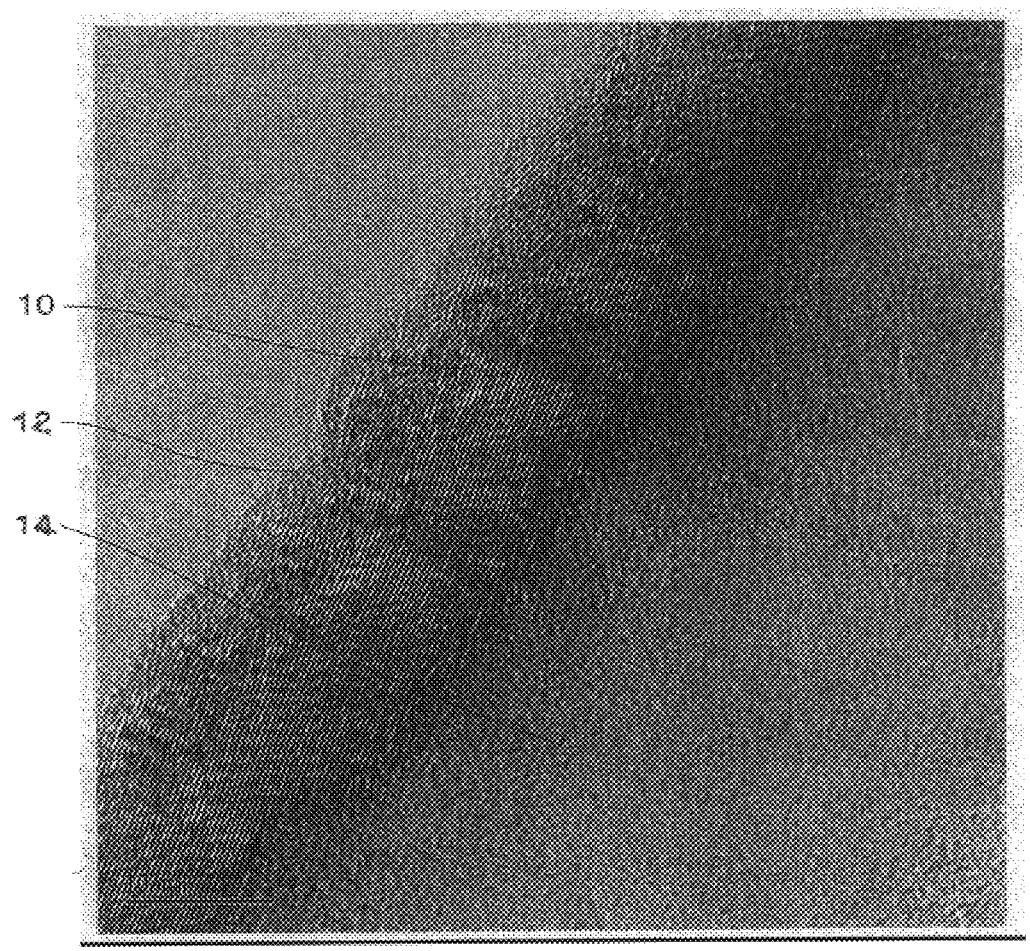
FIG. 1 is a copy of a transmission electron micrograph showing a carbon fiber having a herring-bone structure manufactured by a vapor growth process.
Figure 2:
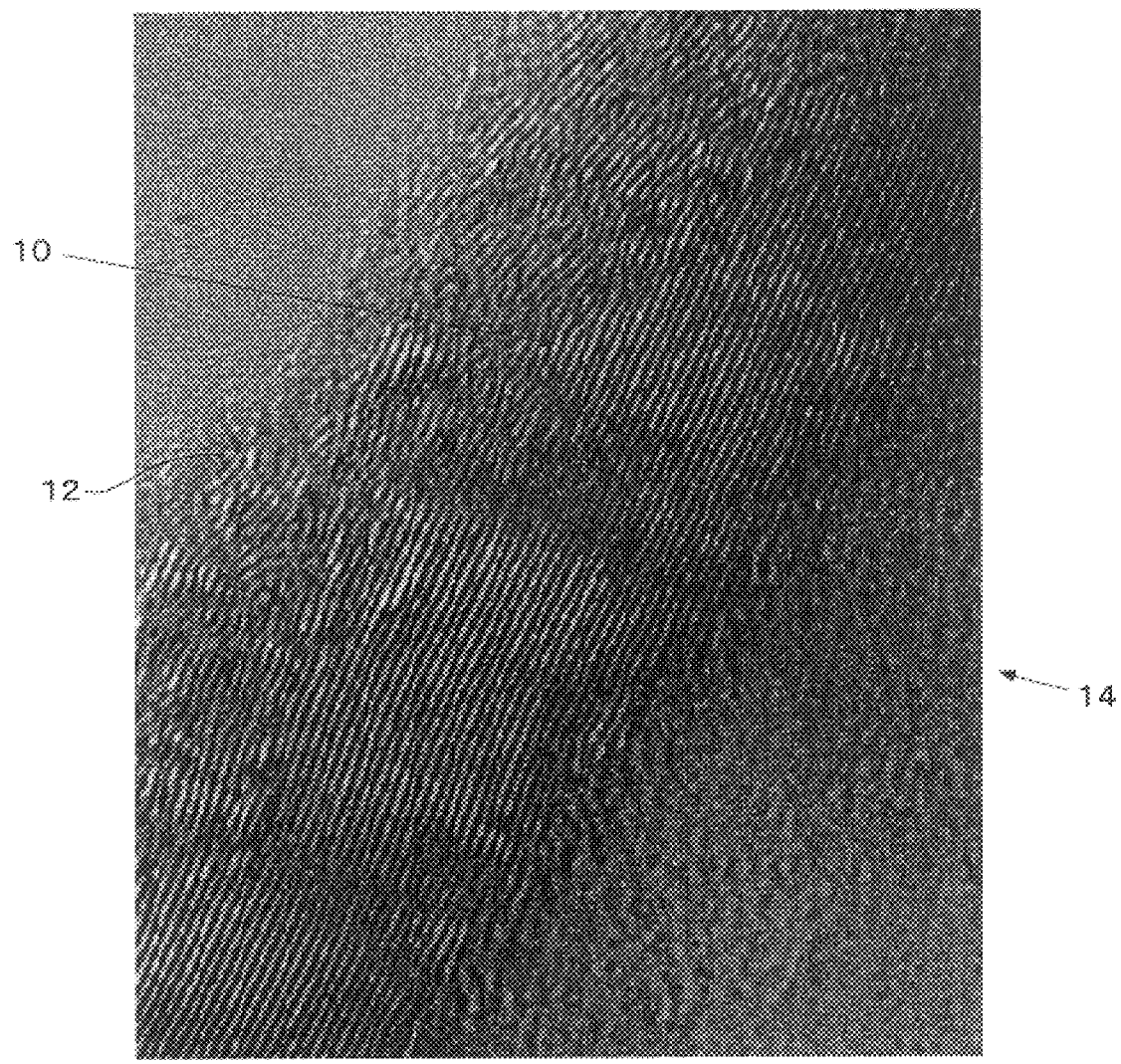
FIG. 2 is a copy of an enlarged micrograph of FIG. 1.
Figure 3:
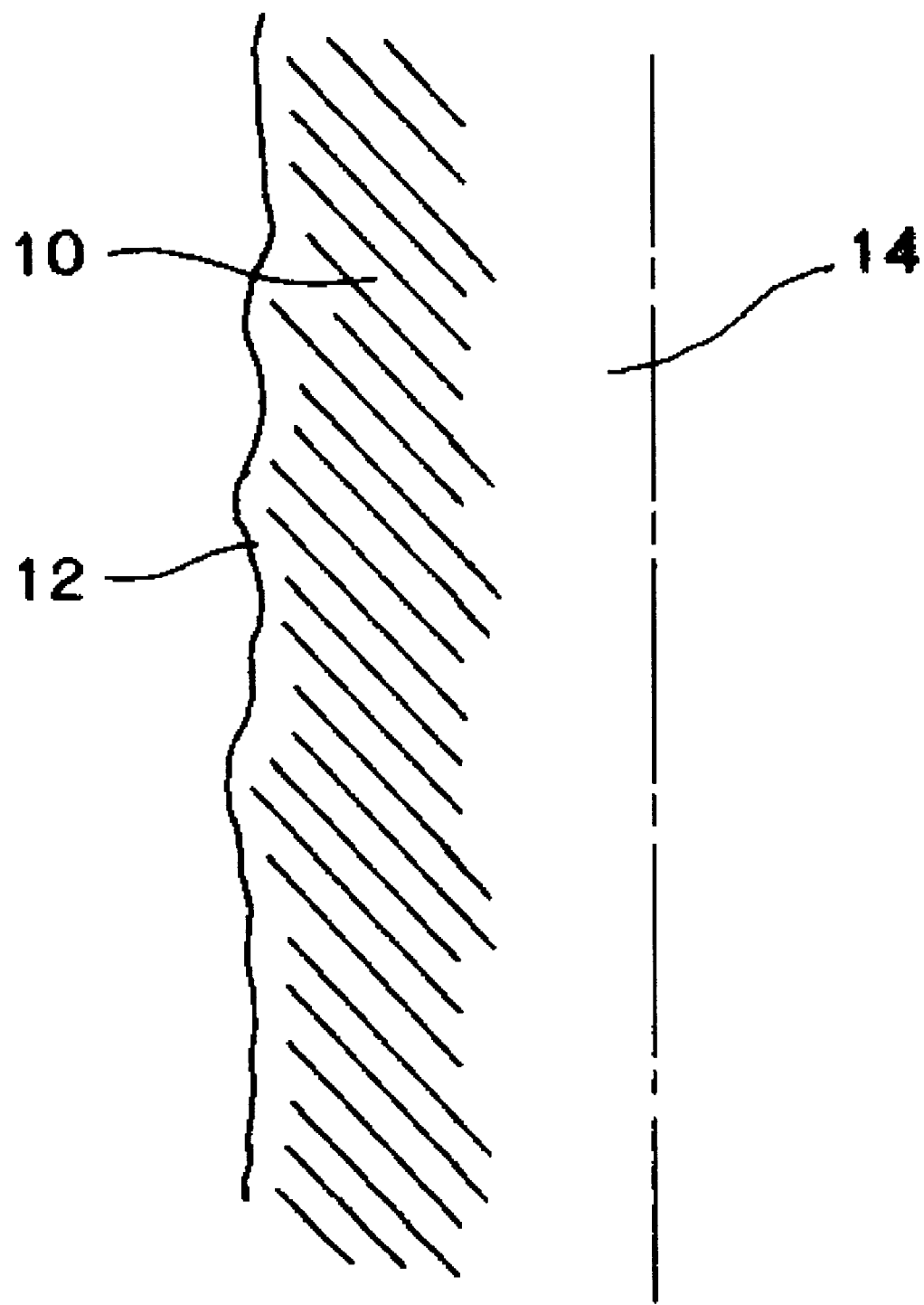
FIG. 3 is a schematic view of FIG. 2.

FIG. 1 is a view showing a copy of a transmission electron micrograph of the carbon fiber having a herring-bone structure manufactured using the vapor growth process. FIG. 2 is a view showing a copy of an enlarged photograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. The thickness of the deposited layer 12 is about several nanometers. A reference numeral 14 indicates the center hole.

Figure 20:
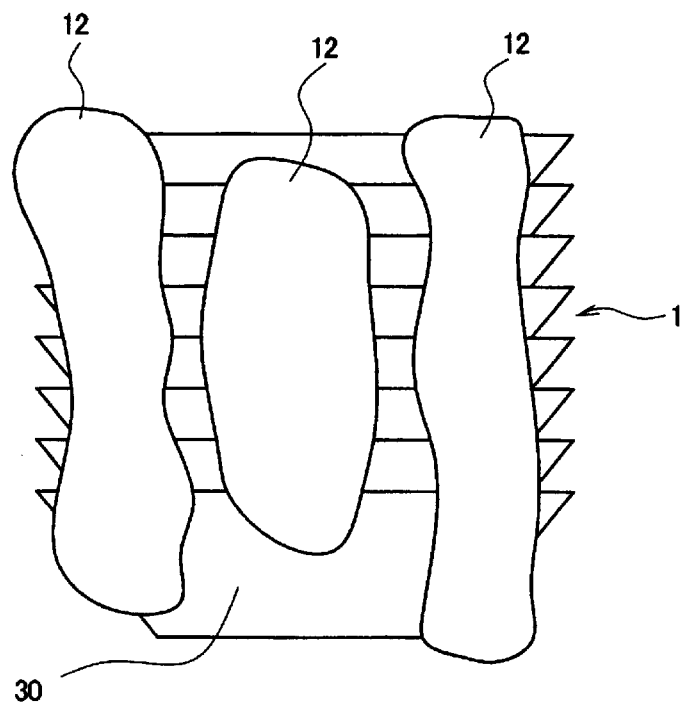
FIG. 20 is a schematic view of a deposited film of pyrolytic carbon formed over a wide range of an outer surface of a carbon fiber.

FIG. 20 is a view schematically showing a state in which the deposited films 12 are formed over a wide area of the outer surface 30 of the carbon fiber 1. As shown in FIG. 20, the hexagonal carbon layers 10 are exposed on the large ring ends 20 in the areas in which the outer surface of the carbon fiber 1 is not covered with the deposited films 12. These areas have a high degree of activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520 to 530° C. for one to several hours in air. As a result, the deposited layers 12 are removed, whereby the edges of the hexagonal carbon layers are further exposed.

The deposited layers 12 maybe removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
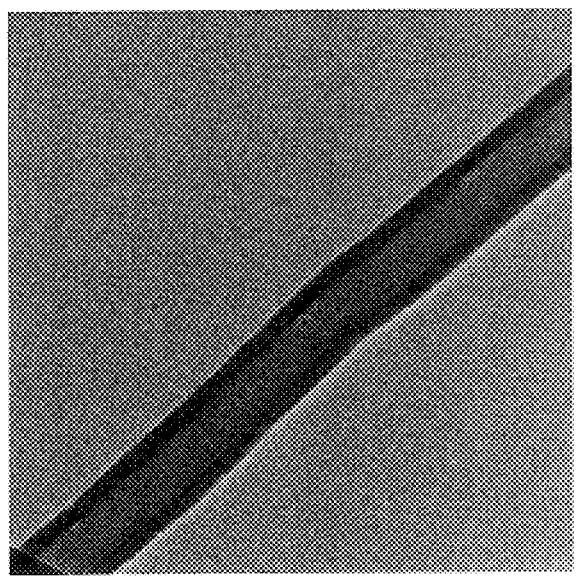
FIG. 4 is a copy of a transmission electron micrograph showing a carbon fiber having a herring-bone structure heated at a temperature of about 530° C. for one hour in air.
Figure 5:
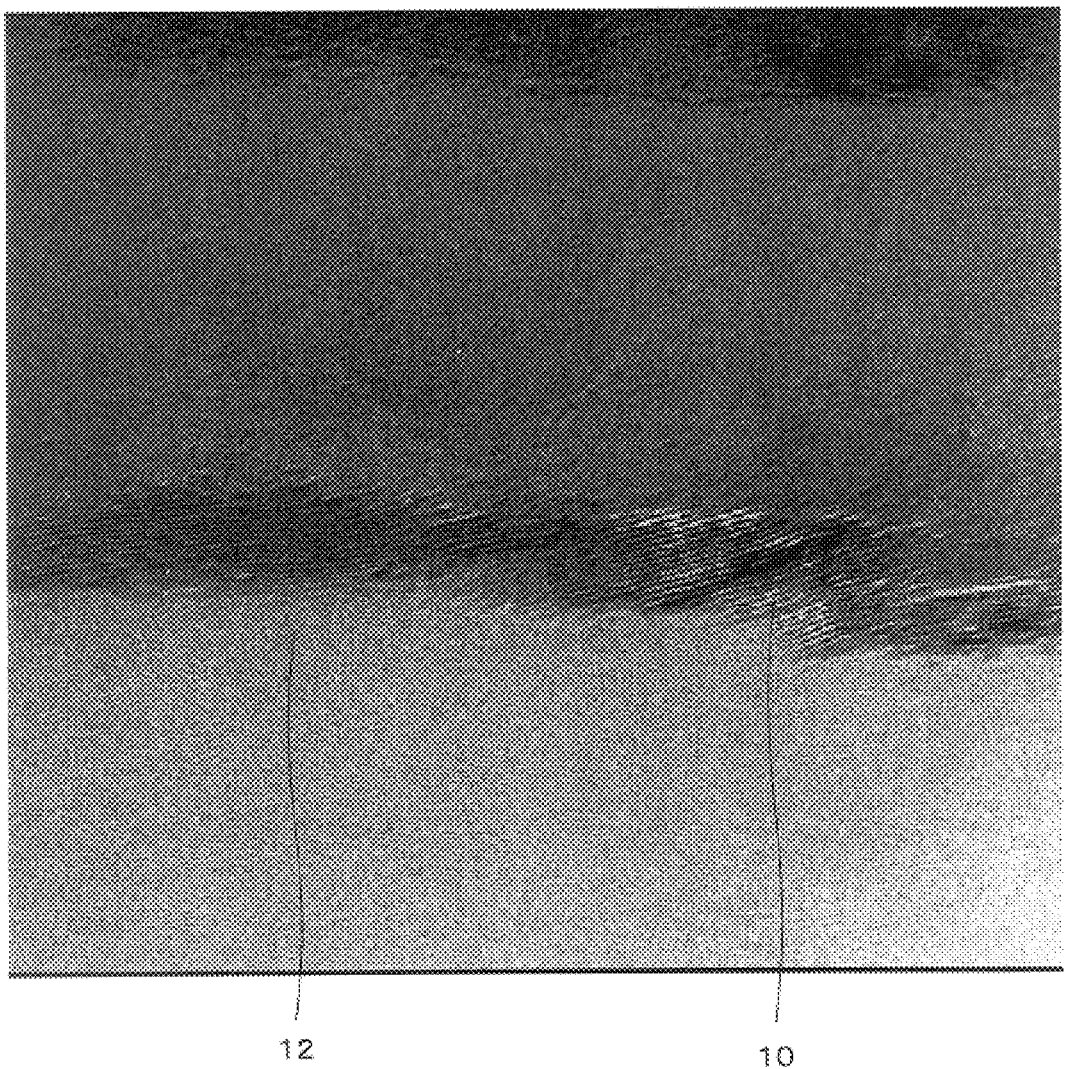
FIG. 5 is an enlarged view of FIG. 4.

FIG. 4 is a copy of a transmission electron micrograph showing the carbon fiber having a herring-bone structure heated at a temperature of about 530° C. for one hour in air. FIG. 5 is an enlarged view of FIG. 4, FIG. 6 is a further enlarged view of FIG. 5, and FIG. 7 is a schematic view of FIG. 6.

Figure 6:
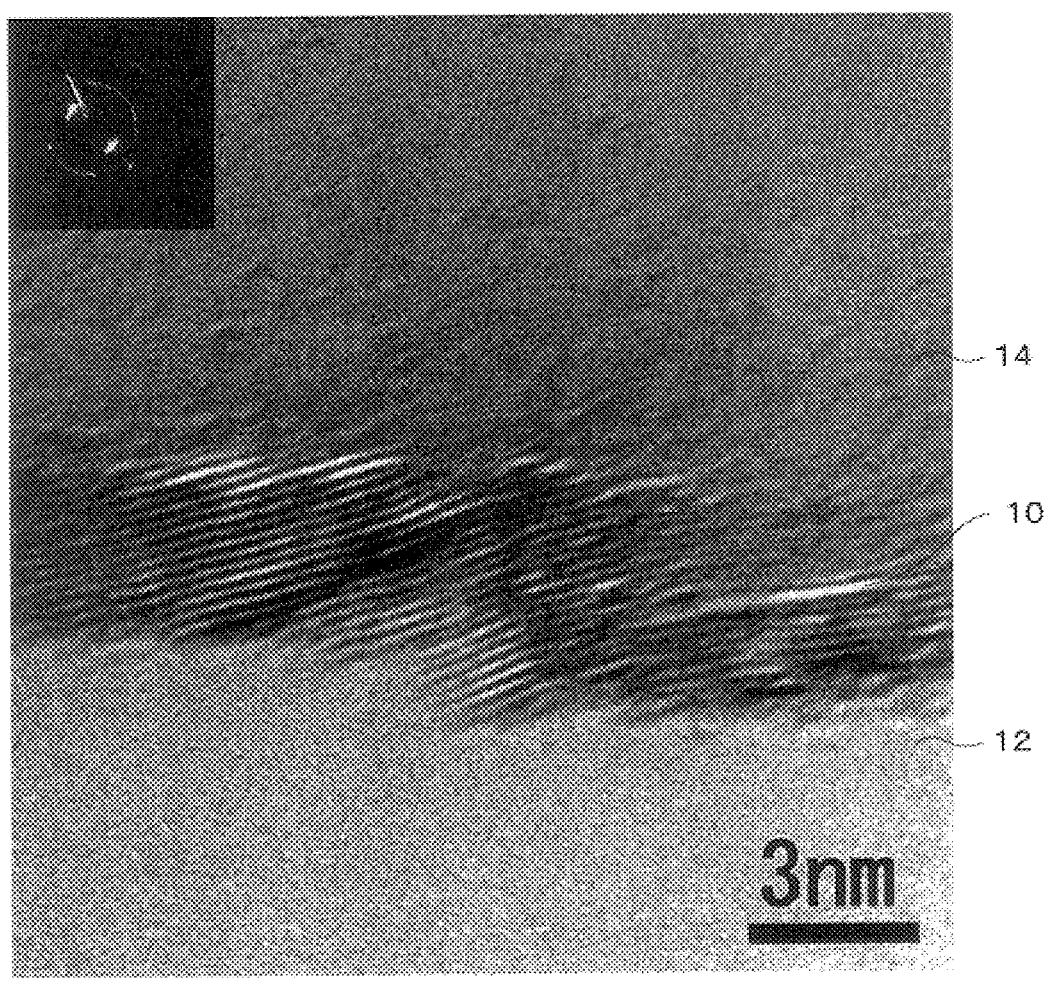
FIG. 6 is a further enlarged view of FIG. 5.
Figure 7:
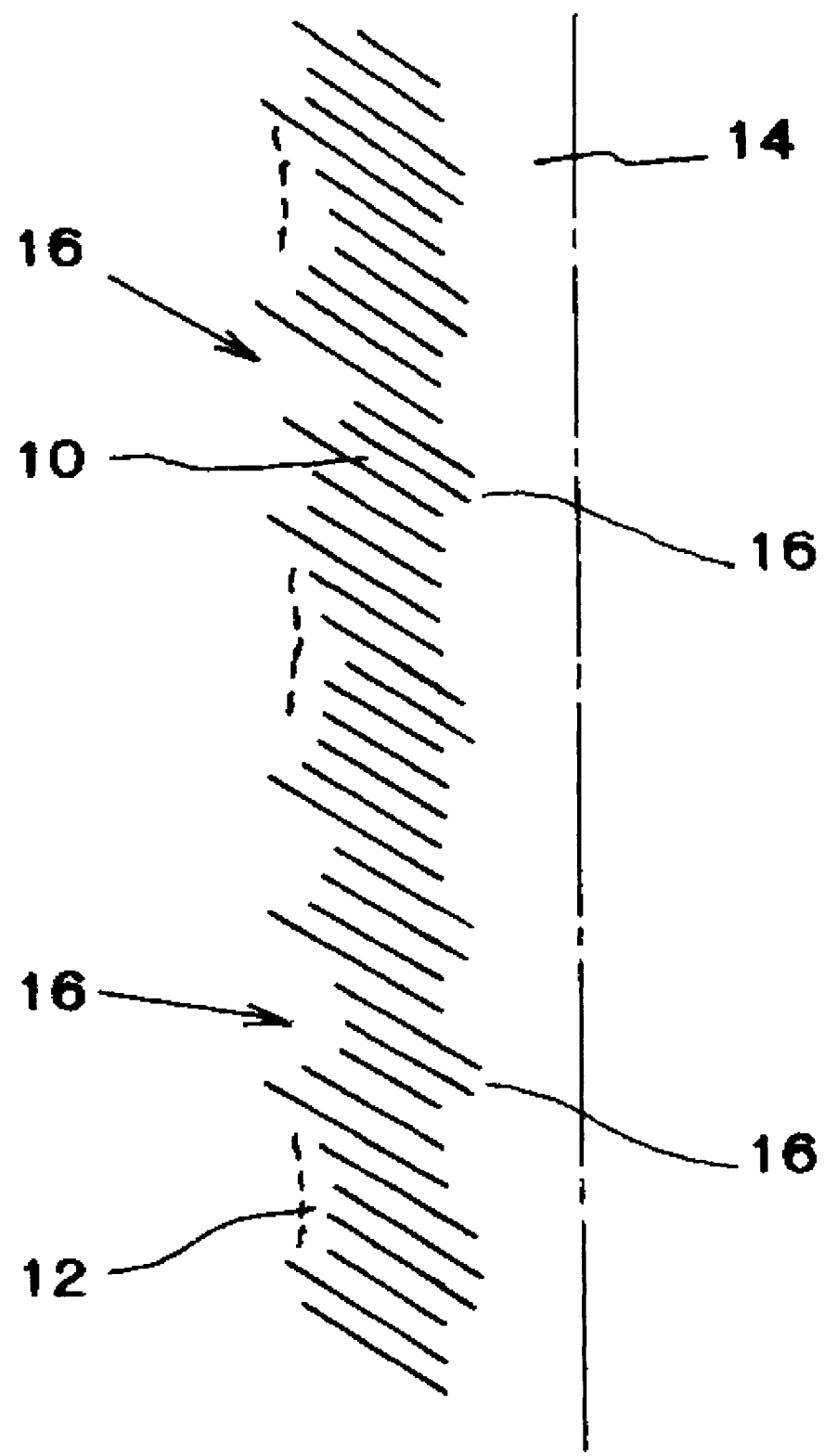
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 1 in which a number of hexagonal carbon layers 10 in the shape of a bottomless cup are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level of atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high degree of activity and easily bond to other atoms. The reasons therefor are considered to be as follows. The heat treatment in air causes the deposited layers 12 to be removed and the amount of functional groups containing oxygen such as a phenolic hydroxyl group, carboxyl group, quinone type carbonyl group, and lactone group, to be increased on the exposed edges of the hexagonal carbon layers 10. These functional groups containing oxygen have high hydrophilicity and high affinity to various types of substances.

In addition, the hollow structure and the irregularities 16 contribute to anchoring effects to a large extent.

Figure 8:
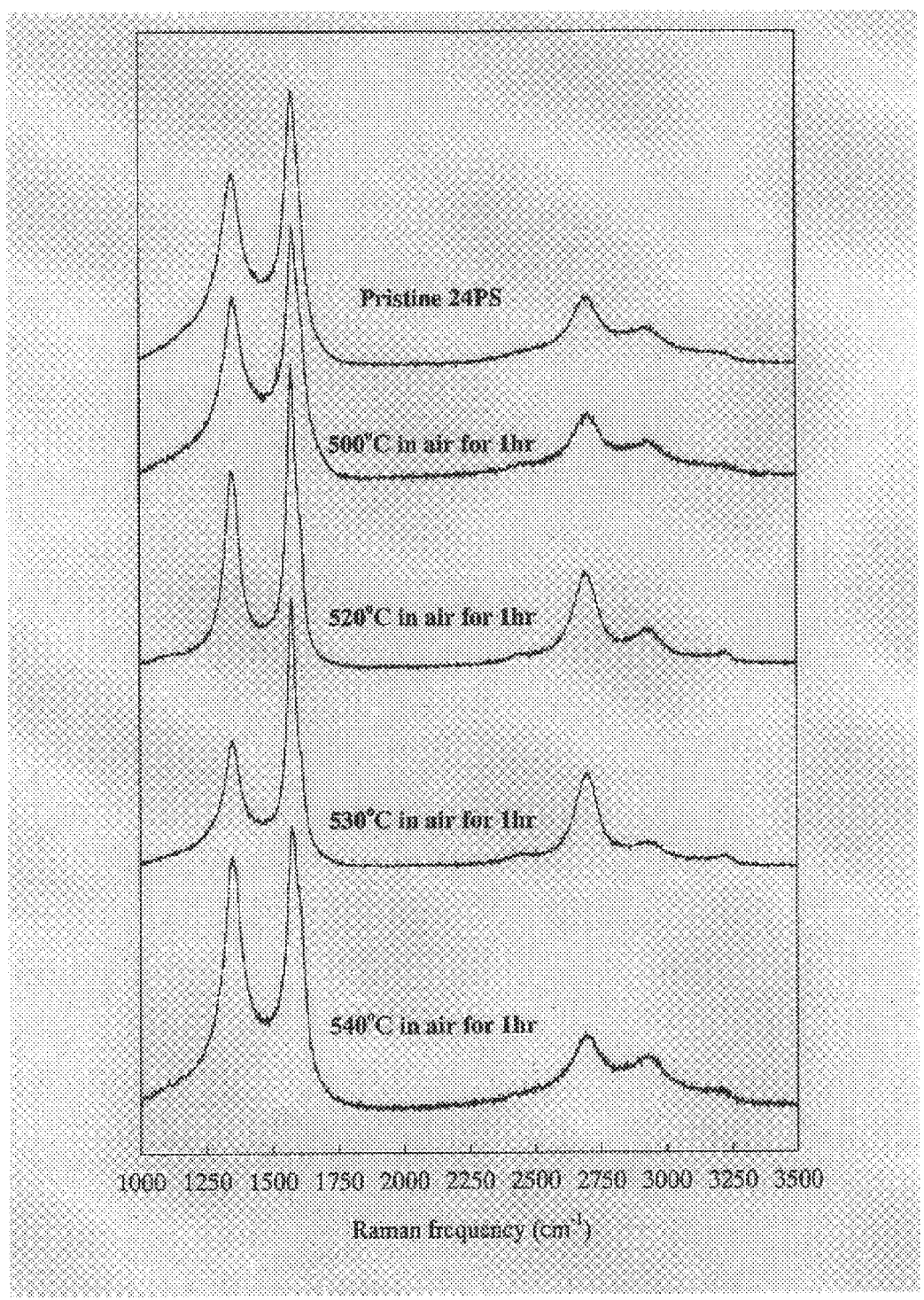
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of the D peak (1360 $cm^{-1}$) and the G peak (1580 $cm^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

Figure 9:
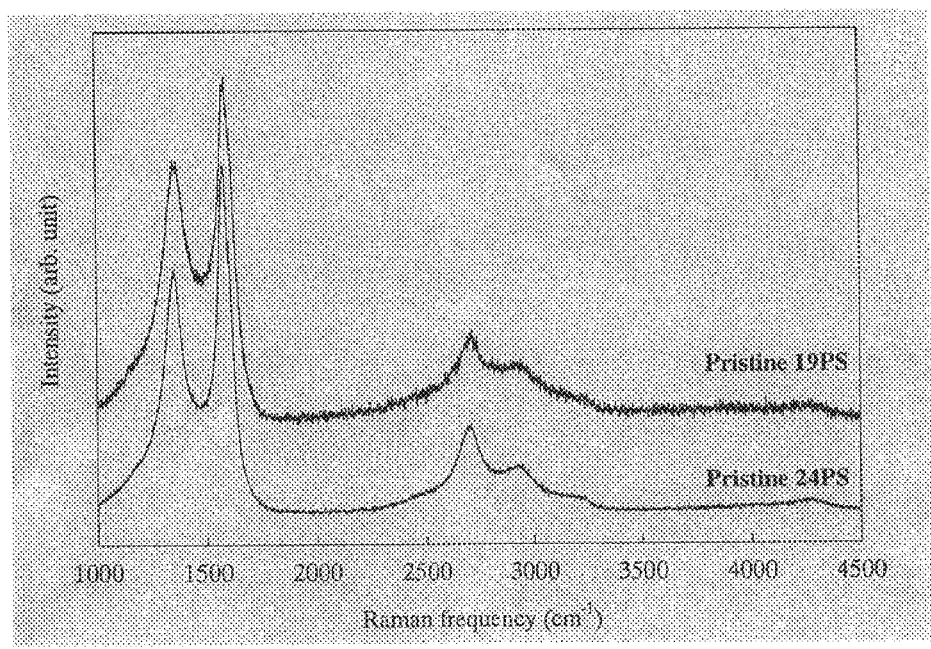
FIG. 9 is a characteristic chart showing the Raman spectra of carbon fiber samples No. 19PS and No. 24PS in which edges of hexagonal carbon layers are exposed by the above heat treatment.

FIG. 9 shows the Raman spectra of carbon fiber samples No. 19PS and No. 24PS in which the edges of the hexagonal carbon layers are exposed by the above heat treatment.

Figure 10:
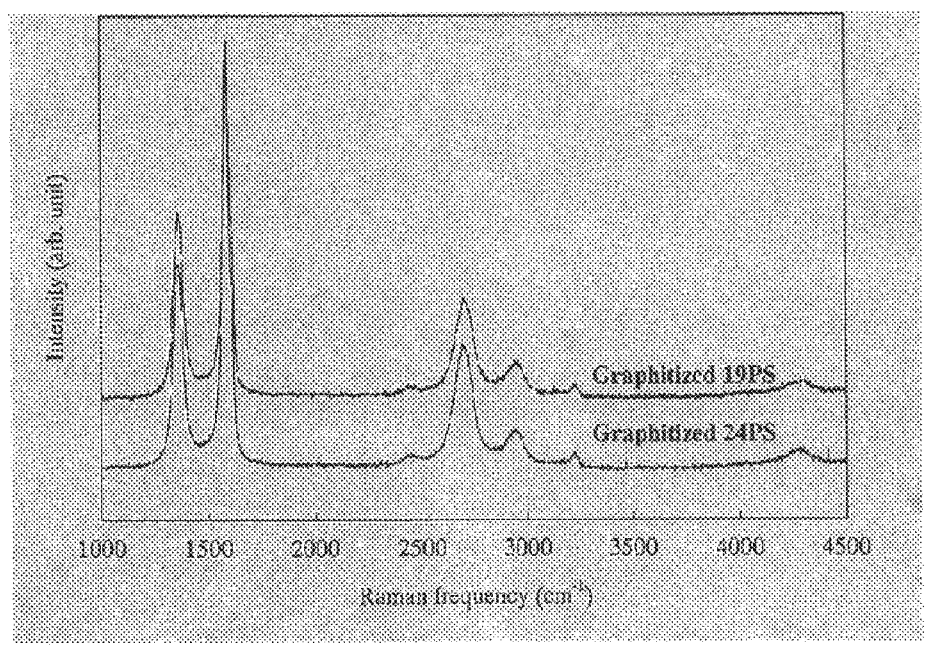
FIG. 10 is a characteristic chart showing the Raman spectra of the carbon fiber samples No. 19PS and No. 24PS heated at 3000° C. after the edges of the hexagonal carbon layers has been exposed.

FIG. 10 shows the Raman spectra of the carbon fiber samples No. 19PS and No. 24PS heated at 3000° C. (common graphitization treatment), after the edges of the hexagonal carbon layers have been exposed.

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

The resulting carbon fiber in which the hexagonal carbon layers are exposed is used as an essential material for electrode of an electric double layer capacitor.

An electrode material according to a second embodiment of the present invention will be described below.

The electrode material of the second embodiment is a carbon fiber in which gaps between hexagonal carbon layers of the carbon fiber of the first embodiment is increased. An expansion treatment of the carbon fiber is described below.

The carbon fiber in which the edges of the hexagonal carbon layers are exposed is immersed in 98% concentrated sulfuric acid, thereby causing the concentrated sulfuric acid to be introduced between the hexagonal carbon layers.

The carbon fiber is heated instantaneously at the temperature ranging from 500° C. to 700° C. As a result, the concentrated sulfuric acid is gasified instantaneously, whereby the gaps between the hexagonal carbon layers are increased due to expansion pressure. The carbon fiber is washed with water to remove residual sulfuric acid. The carbon fiber is then dried under vacuum to obtain an expanded carbon fiber.

Expanded carbon fibers can be obtained also in the case of using a bromine solution, fuming nitric acid, or a tetrahydrofuran (THF)-potassium solution instead of using concentrated sulfuric acid.

Figure 11:
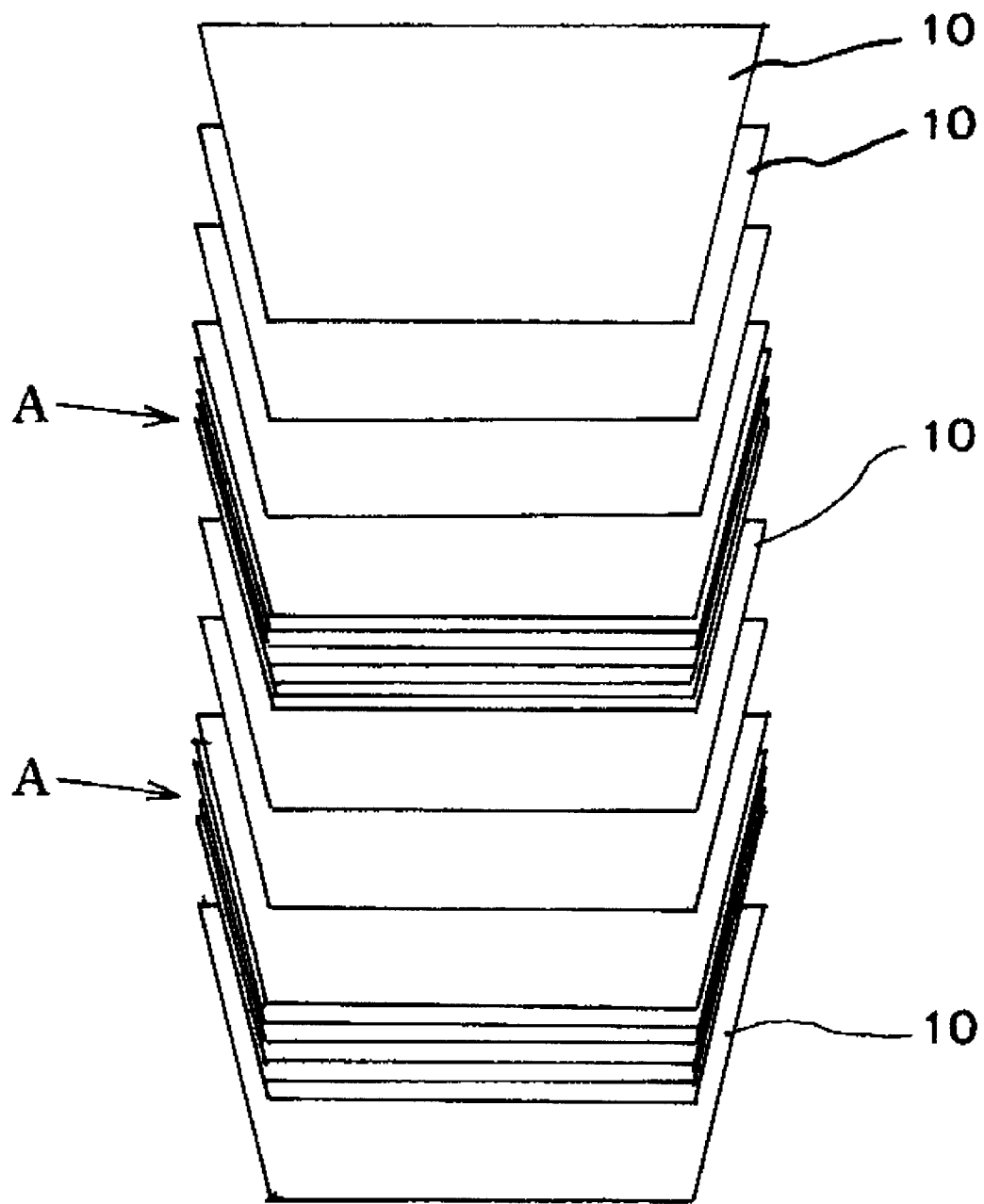
FIG. 11 is a schematic view showing an expanded carbon fiber product.

FIG. 11 is a schematic view of the expanded carbon fiber thus obtained.

As is clear from FIG. 11, gaps between the bottomless cup-shaped or truncated conical hexagonal carbon layers 10 is partially larger than the gaps at the time of the vapor growth. These hexagonal carbon layers 10 having increased gaps bond to each other in part and are not separated completely. Part of the gaps between the hexagonal carbon layers is not increased as indicated by an arrow "A". The resulting carbon fibers could have various lengths. For example, a carbon fiber including only one hexagonal carbon layer 10 completely separated from others, a carbon fiber including several hexagonal carbon layers 10 bonded to one another in a state in which the gaps between layers are increased, and so on. The carbon fiber is generally formed of one to several tens of thousands of the hexagonal carbon layers 10 bonded to one another.

Although a gap between the hexagonal carbon layers 10 at the time of vapor growth is generally 3.54 Å, the gap can be increased by about 100 to 1000 times by the expansion treatment.

The exposed edges of the hexagonal carbon layers 10 of the above carbon fibers have an extremely high degree of activity and easily bond to other atoms. Specifically, the exposed edges can be modified with functional groups such as —COOH, whereby the carbon fiber can be used as an electrode material for an electric double layer capacitor.

An electrode material according to a third embodiment of the present invention will be described below.

A carbon fiber having the herring-bone structure is a short carbon fiber (with a length of several tens of microns) in which several tens of thousands to several hundreds of thousands of bottomless cup-shaped or truncated conical hexagonal carbon layers are stacked. This short carbon fiber has a high molecular weight (length) and is insoluble.

The carbon fiber of this embodiment is obtained by dividing the above short carbon fiber into pieces each of which includes one to several hundreds of stacked hexagonal carbon layers. A carbon fiber can be soluble if the molecular weight is reduced by decreasing the number of stacked layers, in particular, if the number of hexagonal carbon layers is one.

The above short carbon fiber may be divided by adding an appropriate amount of water or solvent and grinding the short carbon fiber softly using a mortar and pestle.

Specifically, the short carbon fiber (in which the deposited layer 12 may be formed, or part or all of the deposited layers 12 may be removed) is placed in a mortar, and ground mechanically and softly with a pestle.

A carbon fiber having one to several hundreds of stacked hexagonal carbon layers can be thus obtained by experimentally regulating the treatment time in a mortar.

Since the cyclic hexagonal carbon layers have a comparatively high strength and are bonded to one another only by a weak Van der Waals force, the cyclic hexagonal carbon layers are separated at the gaps at which the bond is weak, without being crushed.

It is preferable to grind the short carbon fiber with a mortar and a pestle in liquid nitrogen. Water in air is absorbed when liquid nitrogen is evaporated and becomes ice. By grinding the short carbon fiber together with the ice, the mechanical stress is reduced and the short carbon fiber can be separated at the gaps between the hexagonal carbon layers.

The carbon fiber may be ground by ball milling on an industrial scale.

An example in which the length of the carbon fiber is adjusted by ball milling is described below.

A ball mill manufactured by Kabushikigaisha Asahi Rika Seisakujo was used.

Balls used were made of alumina with a diameter of 5 mm. 1 g of the above carbon fiber, 200 g of alumina balls, and 50 cc of distilled water were placed in a cell, and treated at a rotational speed of 350 rpm. The carbon fiber was sampled when 1, 3, 5, 10, and 24 hours had elapsed.

Figure 12:
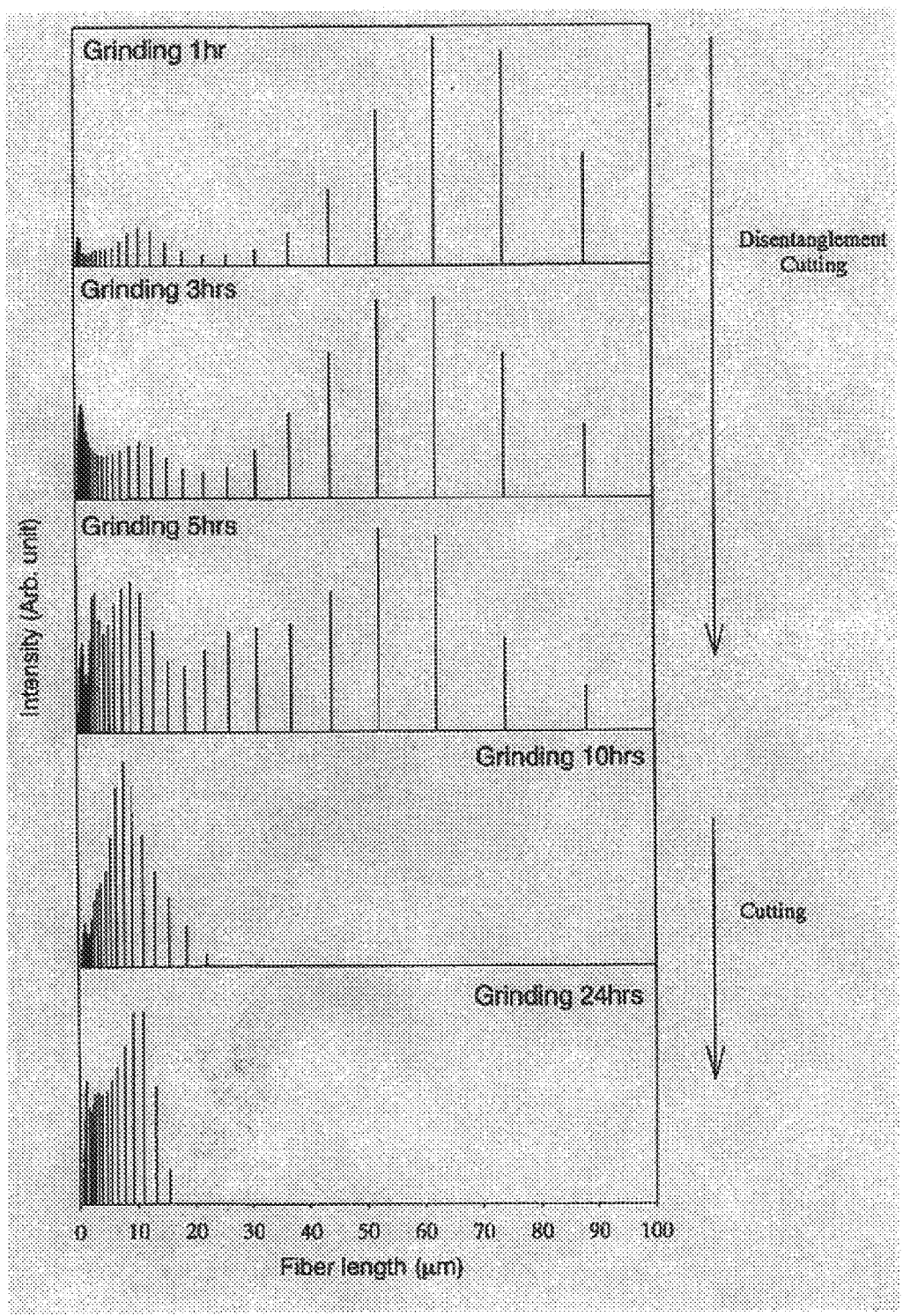
FIG. 12 is a graph showing distributions of the length of the carbon fiber with the passage of time at the time of grinding by ball milling.

FIG. 12 shows distributions of the length of the carbon fiber measured using a laser particle size distribution analyzer at each sampling time.

As is clear from FIG. 12, the fiber length is decreased with the passing of milling time. In particular, the fiber length is decreased rapidly to 10 µm or less after 10 hours have elapsed. Another peak appears at about 1 µm after 24 hours have elapsed. This clearly shows that the fiber length was further decreased. The reason why the peak appears at about 1 µm is considered to be because the length almost equals the diameter, whereby the diameter is counted as the length.

Figure 13:
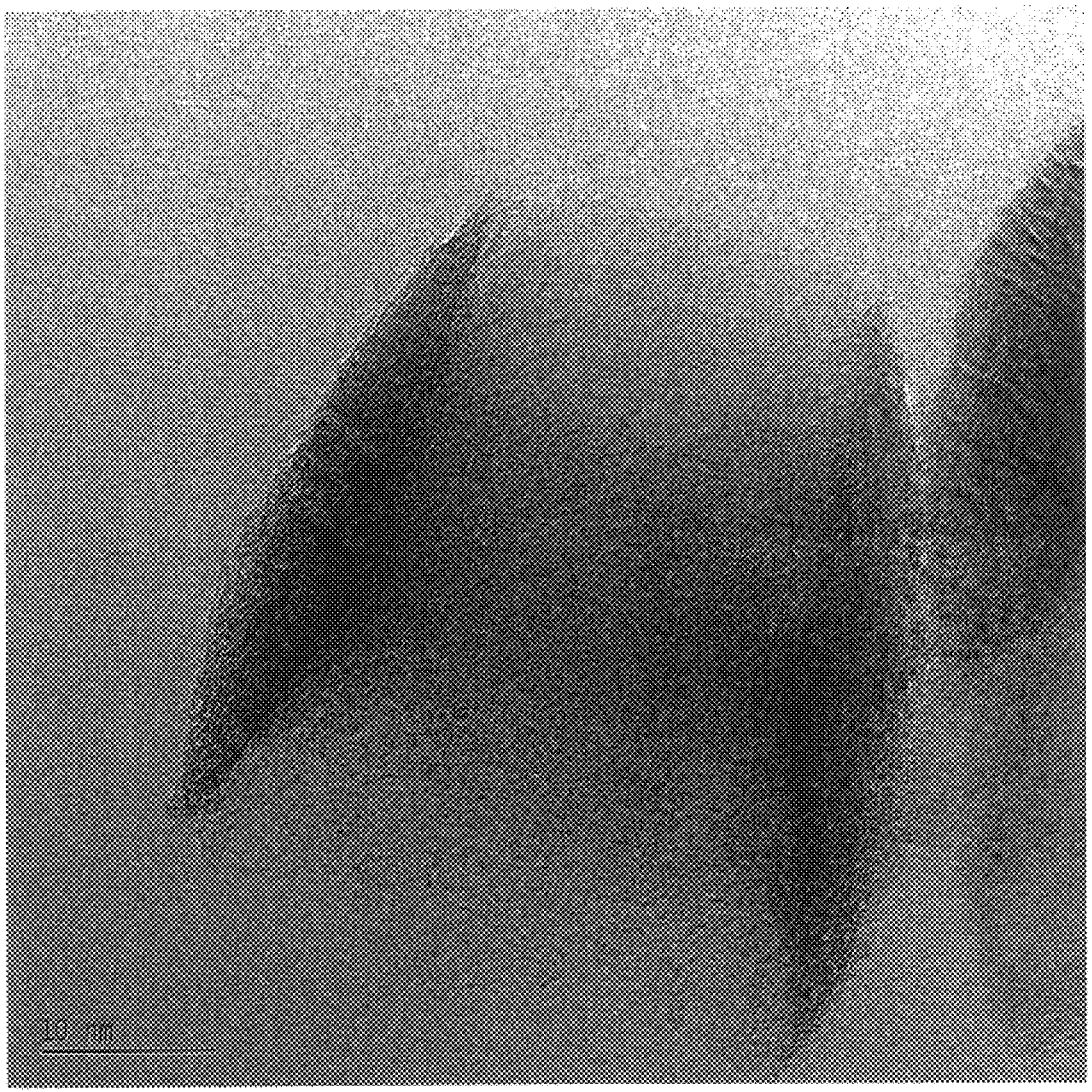
FIG. 13 is a copy of a transmission electron micrograph showing a state in which the carbon fiber is divided into a carbon fiber product in which several tens of bottomless cup-shaped hexagonal carbon layers are stacked.

FIG. 13 is a view showing a copy of a transmission electron micrograph of a very interesting carbon fiber of which the length is adjusted in a state in which several tens of bottomless cup-shaped hexagonal carbon layers are stacked. The carbon fiber product has a hollow shape with no bridge. The edges of the hexagonal carbon layers are exposed on the outer surface side and the inner surface side of the hollow portion. This carbon fiber is in the shape of a tube with a length and a diameter of about 60 nm which has a thin wall and a large hollow portion. The length of the carbon fiber may be adjusted by changing the ball milling conditions.

The bottomless cup-shaped hexagonal carbon layers are thus divided without crushing the shape of the hexagonal carbon layer.

In the case where a conventional concentric carbon nanotube is ground, various problems such as breakage of the tube causing fine split or cracks in the axial direction on the outer surface, or the crush of a core part may occur. Therefore, it is difficult to adjust the length.

As described above, the exposed edges of the hexagonal carbon layers 10 have an extremely high degree of activity and easily bond to other atoms. The reasons therefor are considered to be as follows. The heat treatment in air causes the deposited layers 12 to be removed and the number of functional groups containing oxygen such as a phenolic hydroxyl group, carboxyl group, quinone type carbonyl group, and lactone group to be increased on the exposed edges of the hexagonal carbon layers. These functional groups containing oxygen have high hydrophilicity and high affinity to various types of substances.

In addition, the hollow structure and the irregularities 16 contribute to anchoring effects to a large extent.

Figure 14:
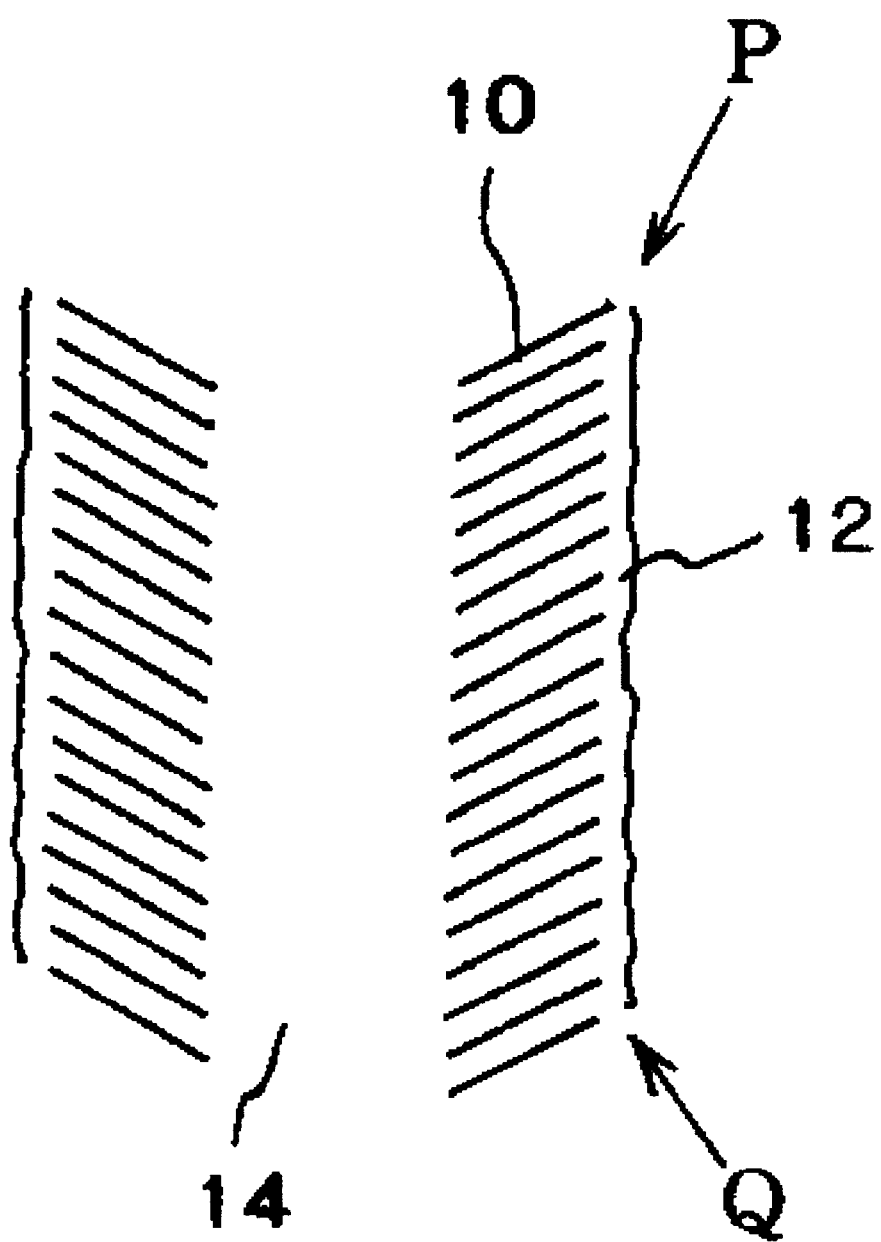
FIG. 14 is a schematic view illustrative of a state in which cyclic edges of the hexagonal carbon layers are exposed on the opposite ends of the carbon fiber.

FIG. 14 is a view showing a carbon fiber obtained by dividing the short carbon fiber covered with the deposited layer 12. The cyclic edges (large ring ends) P and Q of the hexagonal carbon layers 10 on opposite ends are exposed by the dividing even if the short carbon fiber is covered with the deposited layer 12.

The deposited layers 12 adhering to the outer surface of the hexagonal carbon layers 10 in the middle part of the fiber maybe removed by mechanical stress applied by a pestle, whereby the edges of the hexagonal carbon layers 10 in the middle part may be exposed. The deposited film adhering to the inner surface of the hexagonal carbon layers 10 (not shown in FIG. 14) can also be removed.

Figure 15:
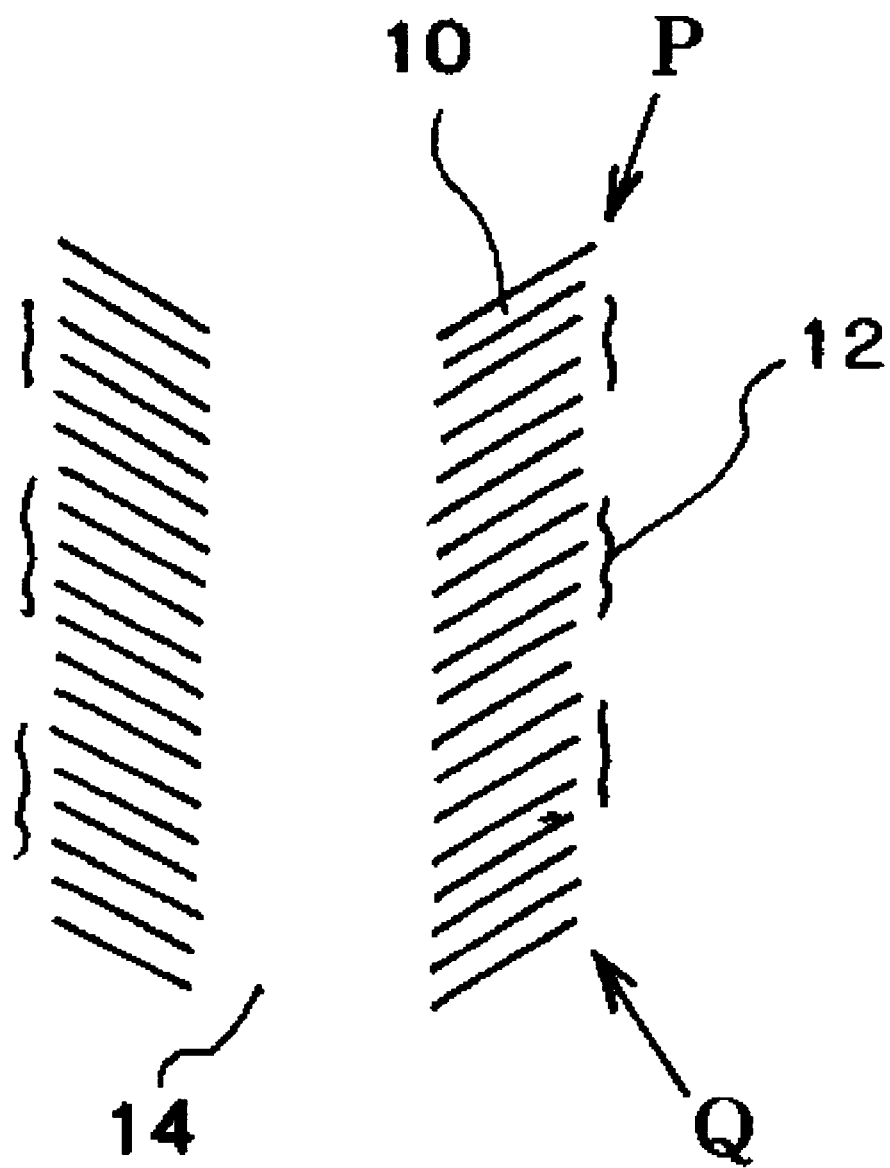
FIG. 15 is a schematic view illustrative of a state in which cyclic edges of the hexagonal carbon layers in the middle part of the carbon fiber are exposed.
Figure 16:
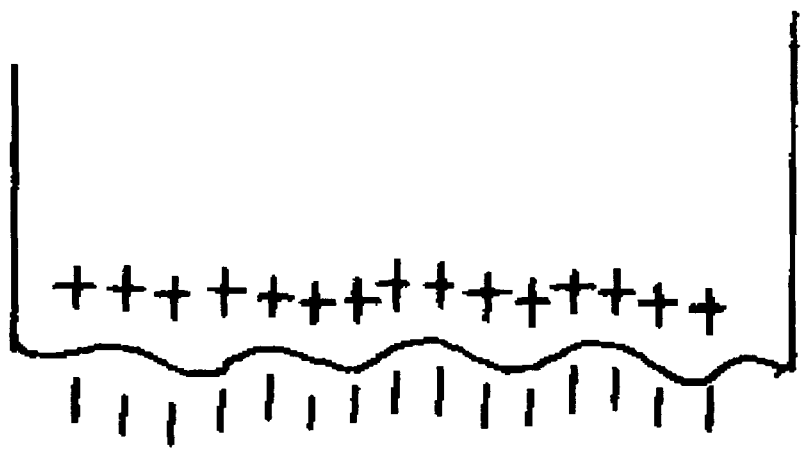
FIG. 16 is a schematic view showing the principle of an electric double layer capacitor.
Figure 16:
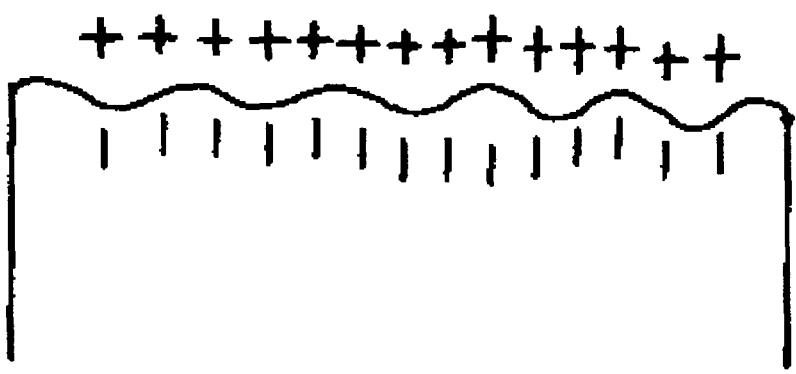

FIG. 15 shows a carbon fiber obtained by dividing the short fiber in which the edges of the hexagonal carbon layers 10 are exposed by previous heat treatment.

In this case, not only the cyclic edges P and Q on the opposite ends, but also the inner and outer edges of the hexagonal carbon layers 10 in the middle part are exposed, whereby the degree of activity is further increased.

The exposed cyclic edges of the hexagonal carbon layers of the third embodiment are extremely chemically active. The exposed edges can be modified with functional groups such as a —COOH group, whereby the carbon fiber can be used as an electrode material for an electric double layer capacitor.

An electric double layer capacitor using the above electrode materials is described below.

A plate-shaped electrode is formed by compression molding the electrode material using a fluororesin as a binder. Note that the binder is not limited to the fluororesin.

An electric double layer capacitor is formed by using this electrode and an aqueous solution of sulfuric acid as an electrolyte.

Thus obtained electric double layer capacitor has a large capacitance more than one million times that of a conventional capacitor.

The reason why such a large-capacitance electric double layer capacitor is obtained is that the specific surface area of the carbon fiber as the electrode material is remarkably larger than that of activated carbon particles.

Specifically, this carbon fiber may have a small diameter of about 30 nm, and the specific surface area of the carbon fiber is remarkably larger than that of activated carbon. Moreover, the carbon fiber in which the edges of the bottomless cup-shaped hexagonal carbon layers are exposed has extremely minute irregularities at the level of atoms on the surface. This further increases the specific surface area, whereby an electric double layer capacitor having a further increased capacitance can be obtained.

As described above, according to the electrode material for an electric double layer capacitor and the electric double layer capacitor using the electrode material of these embodiments, the specific surface area of the electrode material is remarkably greater than that of activated carbon and an extremely large capacitance can be obtained.

What is claimed is:

1. An electrode material for an electric double layer capacitor comprising a carbon fiber as an essential material,
    wherein the carbon fiber has a coaxial stacking morphology of truncated conical tubular graphene layers;
    wherein each of the truncated conical tubular graphene layers includes a hexagonal carbon layer and has a large ring end at one end and a small ring end at the other end in an axial direction; and
    wherein at least part of edges of the hexagonal carbon layers is exposed at the large ring ends.

2. The electrode material for an electric double layer capacitor as defined in claim 1,
    wherein at least part of edges of the hexagonal carbon layers is exposed at the small ring ends.

3. The electrode material for an electric double layer capacitor as defined in claim 2,
    wherein the coaxial stacking morphology of the truncated conical tubular graphene layers is vapor grown; and
    wherein at least part of a deposited film formed during the vapor growth is removed from the large and small ring ends.

4. The electrode material for an electric double layer capacitor as defined in claim 1,
    wherein the coaxial stacking morphology of the truncated conical tubular graphene layers has a shape of a hollow core with no bridge.

5. The electrode material for an electric double layer capacitor as defined in claim 1,
    wherein an outer surface of the carbon fiber is formed of the large ring ends stacked in the axial direction; and
    wherein the exposed part of the edges of the hexagonal carbon layers has an area equal to or more than 2 percentages of an area of the outer surface.

6. The electrode material for an electric double layer capacitor as defined in claim 5,
    wherein positions of the large ring ends forming the outer surface are irregular, and the outer surface has minute irregularity at the level of atoms.

7. The electrode material for an electric double layer capacitor as defined in claim 1,
    wherein an inner surface of the carbon fiber is formed of the small ring ends stacked in the axial direction; and
    wherein positions of the small ring ends forming the inner surface are irregular, and the inner surface has minute irregularity at the level of atoms.

8. The electrode material for an electric double layer capacitor as defined in claim 1,
    wherein the coaxial stacking morphology of the truncated conical tubular graphene layers is vapor grown; and
    wherein at least part of gaps between the hexagonal carbon layers is larger than the gaps between the hexagonal carbon layers at the time of the vapor growth.

9. The electrode material for an electric double layer capacitor as defined in claim 8, having a bulk density of 0.010 g/cm$^3$ or less.

10. The electrode material for an electric double layer capacitor as defined in claim 8,
    wherein at least part of the gaps between the hexagonal carbon layers is 100 to 1000 times larger than the gaps between the hexagonal carbon layers at the time of the vapor growth.

11. The electrode material for an electric double layer capacitor as defined in claim 8,
    wherein one to several tens of thousands of the hexagonal carbon layers are stacked.

12. An electric double layer capacitor in which the electrode material as defined in claim 1 is used for an electrode.

13. An electrode material for an electric double layer capacitor comprising a carbon fiber as an essential material,
    wherein the carbon fiber has a coaxial stacking morphology of truncated conical tubular graphene layers;
    wherein the coaxial stacking morphology of the truncated conical tubular graphene layers includes one to several hundreds of stacked hexagonal carbon layers;
    wherein each of the truncated conical tubular graphene layers includes a hexagonal carbon layer and has a large ring end at one end and a small ring end at the other end in an axial direction; and
    wherein at least part of edges of the hexagonal carbon layers is exposed at the large ring ends.

14. The electrode material for an electric double layer capacitor as defined in claim 13,
    wherein at least part of edges of the hexagonal carbon layers is exposed at the small ring ends.

15. The electrode material for an electric double layer capacitor as defined in claim 14,
    wherein the coaxial stacking morphology of the truncated conical tubular graphene layers is vapor grown; and
    wherein at least part of a deposited film formed during the vapor growth is removed from the large and small ring ends.

16. The electrode material for an electric double layer capacitor as defined in claim 13, wherein the coaxial stacking morphology of the truncated conical tubular graphene layers has a shape of a hollow core with no bridge.

17. The electrode material for an electric double layer capacitor as defined in claim 13, wherein an outer surface of the carbon fiber is formed of the large ring ends stacked in the axial direction; and wherein the exposed part of the edges of the hexagonal carbon layers has an area equal to or more than 2 percentages of an area of the outer surface.

18. The electrode material for an electric double layer capacitor as defined in claim 17, wherein positions of the large ring ends forming the outer surface are irregular, and the outer surface has minute irregularity at the level of atoms.

19. The electrode material for an electric double layer capacitor as defined in claim 13, wherein an inner surface of the carbon fiber is formed of the small ring ends stacked in the axial direction; and wherein positions of the small ring ends forming the inner surface are irregular, and the inner surface has minute irregularity at the level of atoms.

20. An electric double layer capacitor in which the electrode material as defined in claim 13 is used for an electrode.

* * * * *

UNITED STATES PATENT AND TRADEMARK OFFICE
CERTIFICATE OF CORRECTION

PATENT NO. : 6,654,229 B2
DATED : November 25, 2003
INVENTOR(S) : Takashi Yanagisawa and Morinobu Endo It is certified that error appears in the above-identified patent and that said Letters Patent is hereby corrected as shown below:

<u>Title page,</u>
Add Item [30] as follows:
-- [30]  Foreign Application Priority Data
    March 21, 2001 (JP).........................2001-081744
    August 29, 2001 (JP).......................2001-260427 --

Signed and Sealed this

Sixth Day of July, 2004

JON W. DUDAS
*Acting Director of the United States Patent and Trademark Office*